United States Patent
Kuroda et al.

(10) Patent No.: US 8,036,074 B2
(45) Date of Patent: Oct. 11, 2011

(54) INFORMATION RECORDING MEDIUM, INFORMATION RECORDING DEVICE AND METHOD, AND COMPUTER PROGRAM

(75) Inventors: Kazuo Kuroda, Saitama (JP); Takao Sawabe, Saitama (JP)

(73) Assignee: Pioneer Corporation, Tokyo (JP)

(*) Notice: Subject to any disclaimer, the term of this patent is extended or adjusted under 35 U.S.C. 154(b) by 376 days.

(21) Appl. No.: 12/307,372

(22) PCT Filed: Jul. 7, 2006

(86) PCT No.: PCT/JP2006/313602
§ 371 (c)(1),
(2), (4) Date: Jan. 12, 2009

(87) PCT Pub. No.: WO2008/004308
PCT Pub. Date: Jan. 10, 2008

(65) Prior Publication Data
US 2009/0285065 A1    Nov. 19, 2009

(51) Int. Cl.
*G11B 7/00* (2006.01)
(52) U.S. Cl. .................................. 369/47.27
(58) Field of Classification Search ........... 369/53.22, 369/47.1, 47.27, 275.2, 275.3; 386/248, 386/241
See application file for complete search history.

(56) References Cited

U.S. PATENT DOCUMENTS

| | | | |
|---|---|---|---|
| 5,907,658 A * | 5/1999 | Murase et al. | 386/248 |
| 6,222,805 B1 * | 4/2001 | Mori et al. | 369/47.24 |
| 6,259,858 B1 * | 7/2001 | Ando et al. | 386/241 |
| 6,580,872 B1 * | 6/2003 | Kikuchi et al. | 386/248 |
| 2002/0168086 A1 | 11/2002 | Sugahara | |
| 2003/0016744 A1 | 1/2003 | Nakagawa | |

FOREIGN PATENT DOCUMENTS

| | | |
|---|---|---|
| JP | 9-270986 | 10/1997 |
| JP | 10-3745 | 1/1998 |
| JP | 10-232918 | 9/1998 |
| JP | 2000-173176 | 6/2000 |
| JP | 2004-127486 | 4/2004 |
| JP | 2004-342175 | 12/2004 |

OTHER PUBLICATIONS

International Search Report and International Preliminary Examination Report of PCT/JP2006/313602 filed Jul. 7, 2006.

* cited by examiner

*Primary Examiner* — Nabil Z Hindi
(74) *Attorney, Agent, or Firm* — Young & Thompson

(57) ABSTRACT

An information recording medium (10) is provided with: a first area in which first data is recorded, first data region information being assigned to the first data; a second area in which second data is recorded, second data region information being assigned to the second data; and a control area in which control data including setting command data (72) is recorded, the setting command data setting the first data region information as reference region information, which is referred to by an information reproducing apparatus, if the first data is reproduced.

10 Claims, 8 Drawing Sheets

[FIG. 1]
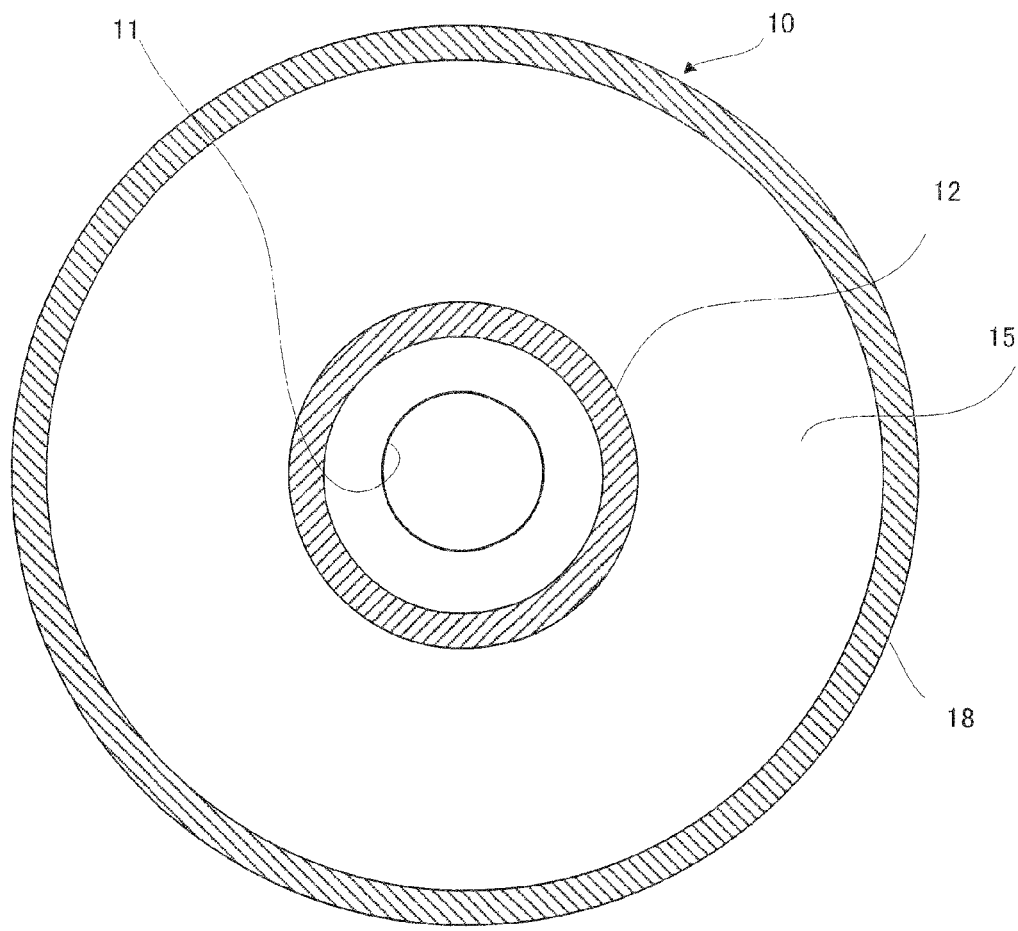
(a)
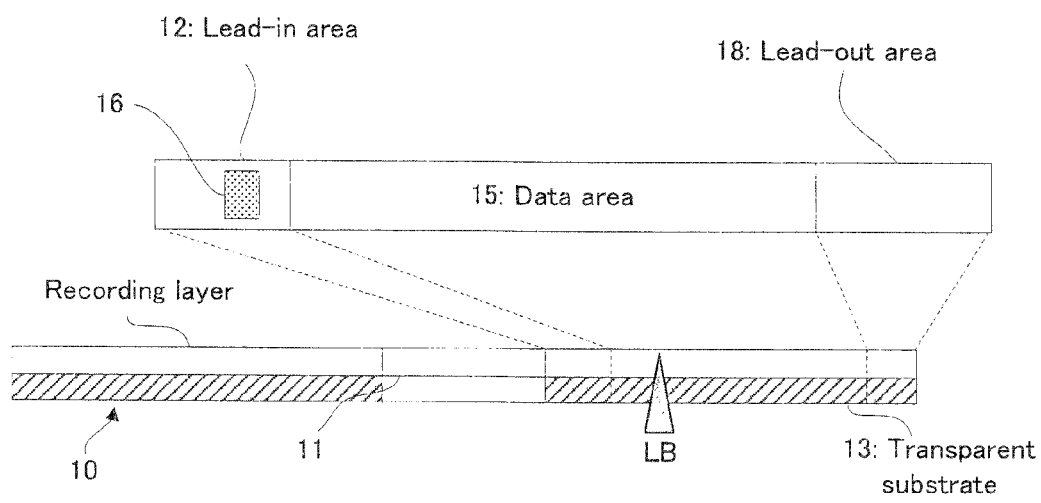
(b)

[FIG. 2]
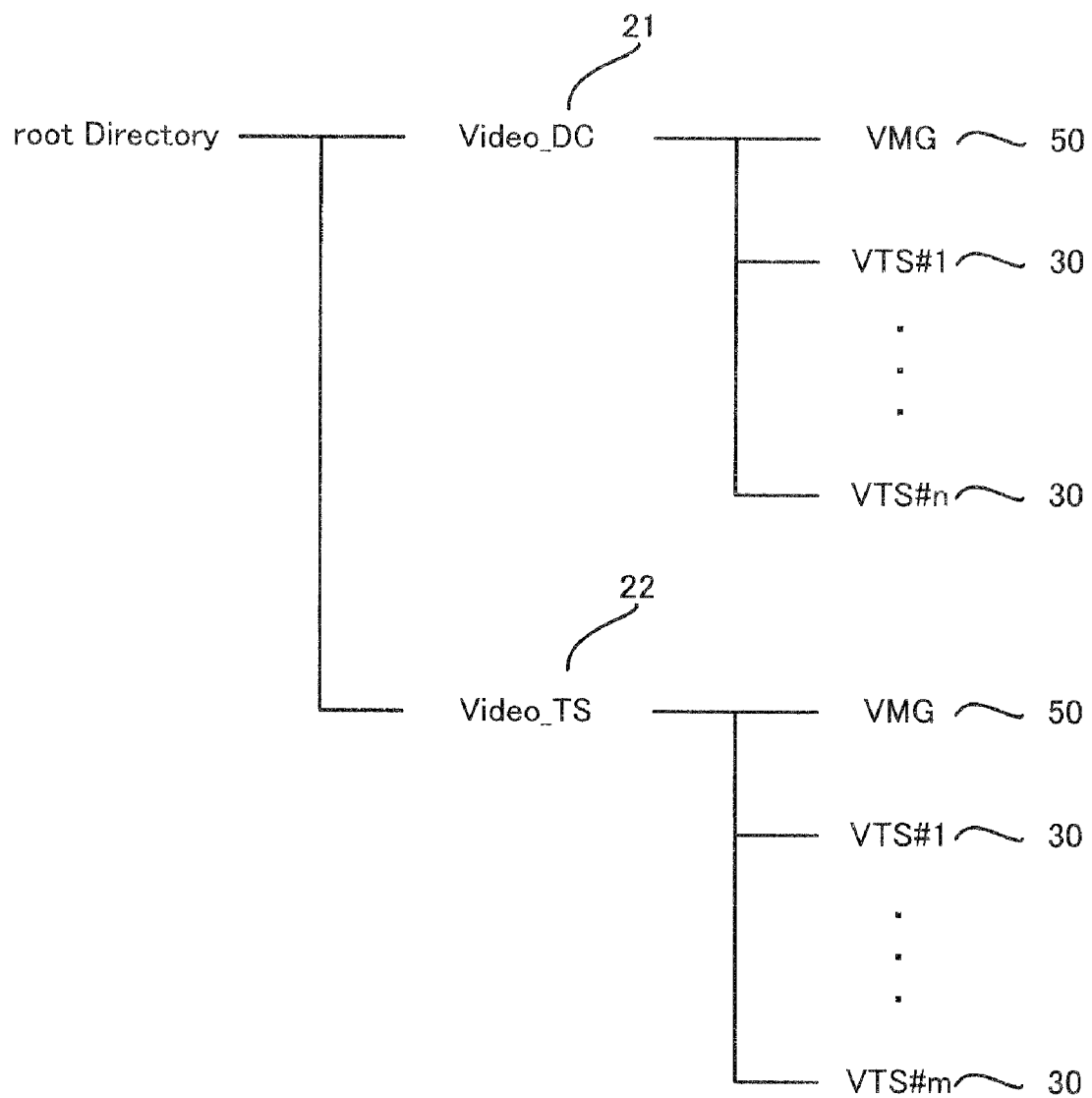

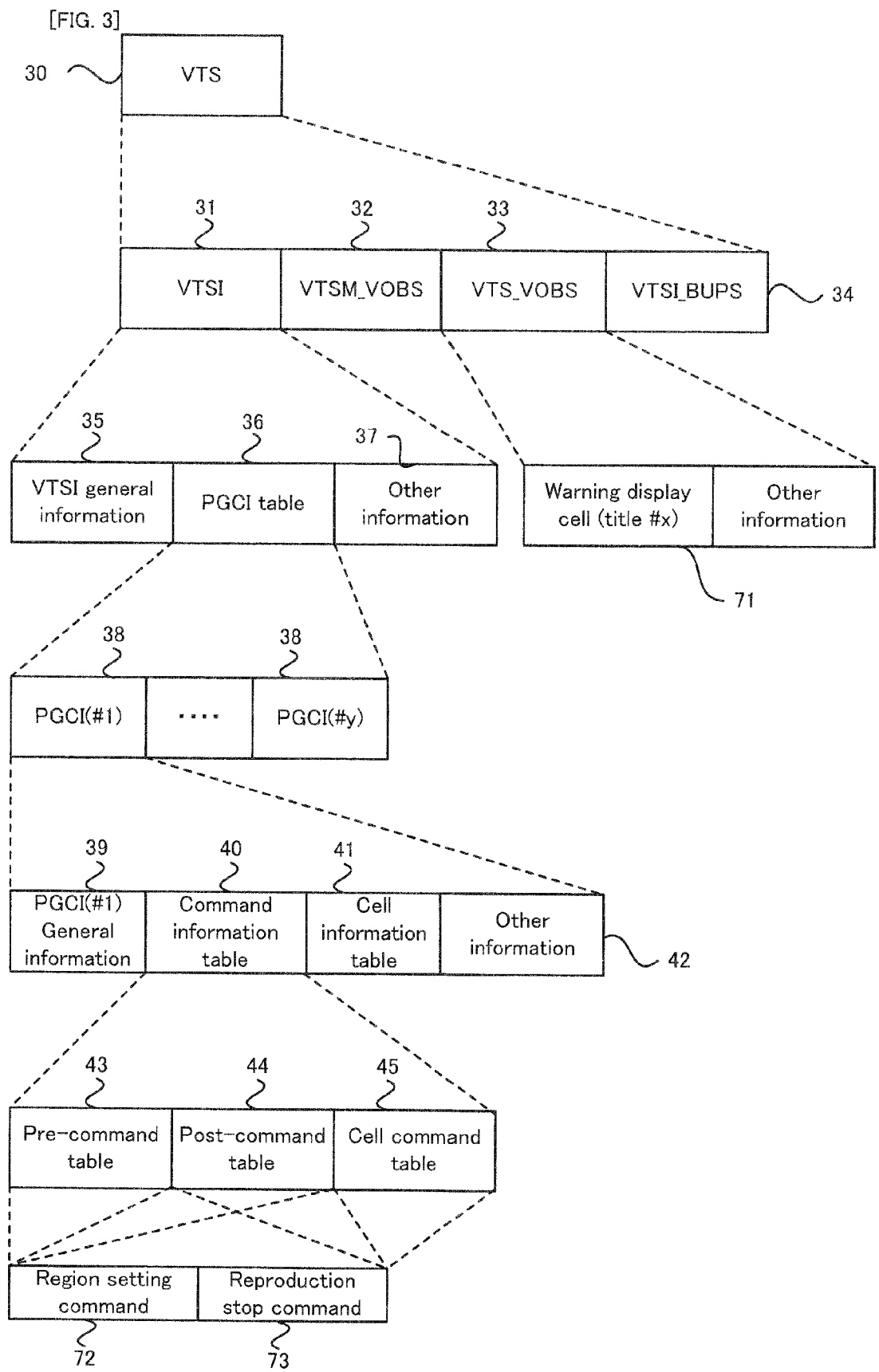

[FIG. 4]
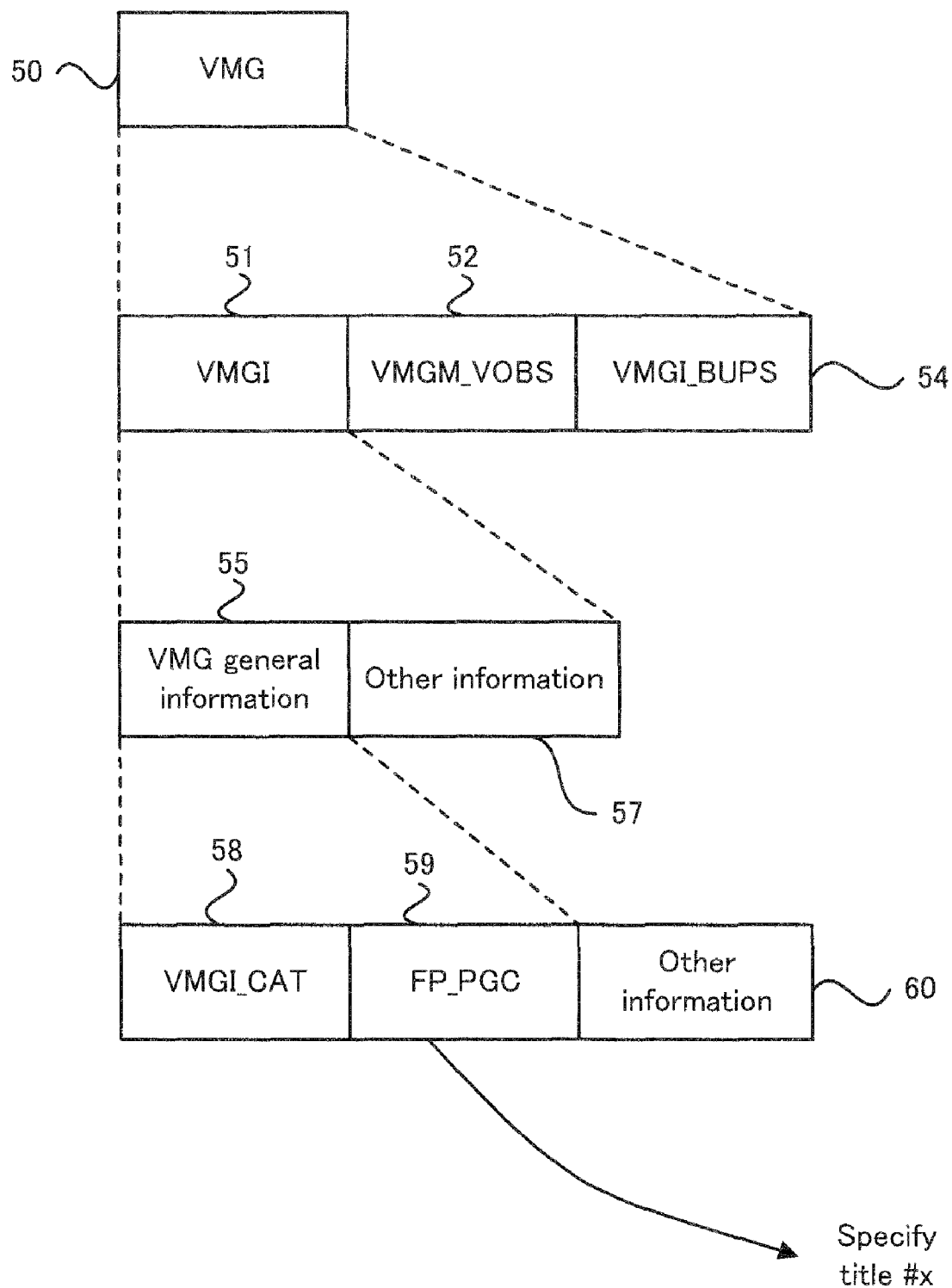

[FIG. 5]
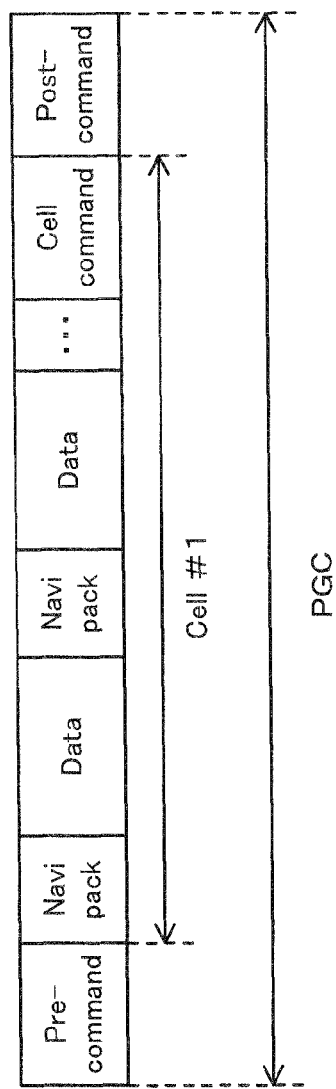

[FIG. 6]
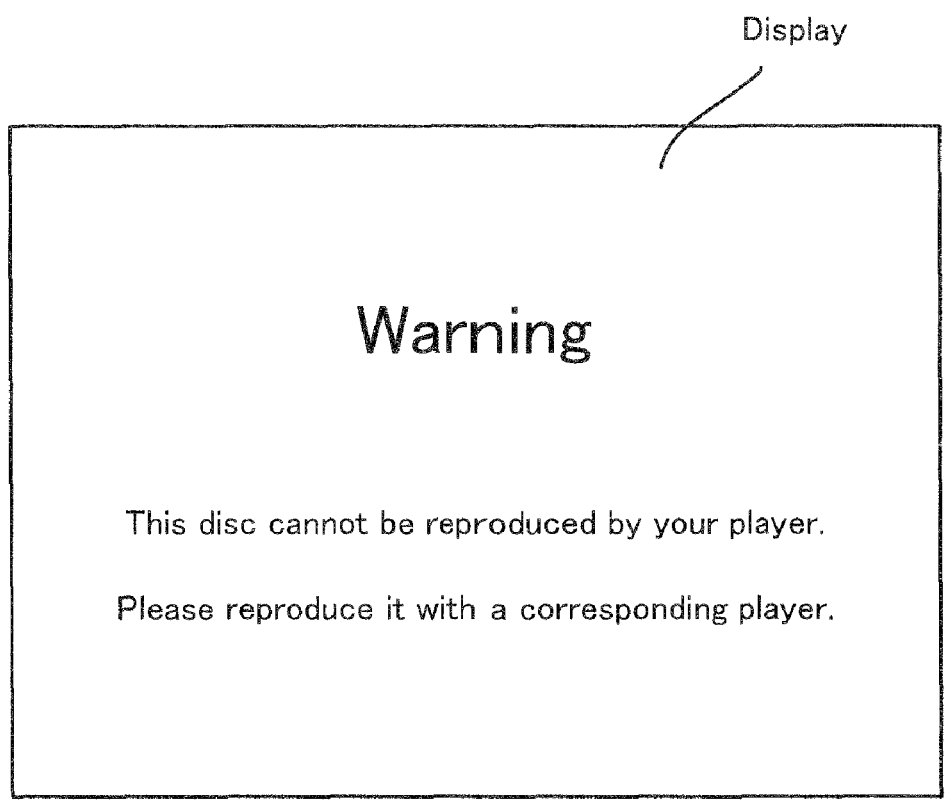

[FIG. 7]
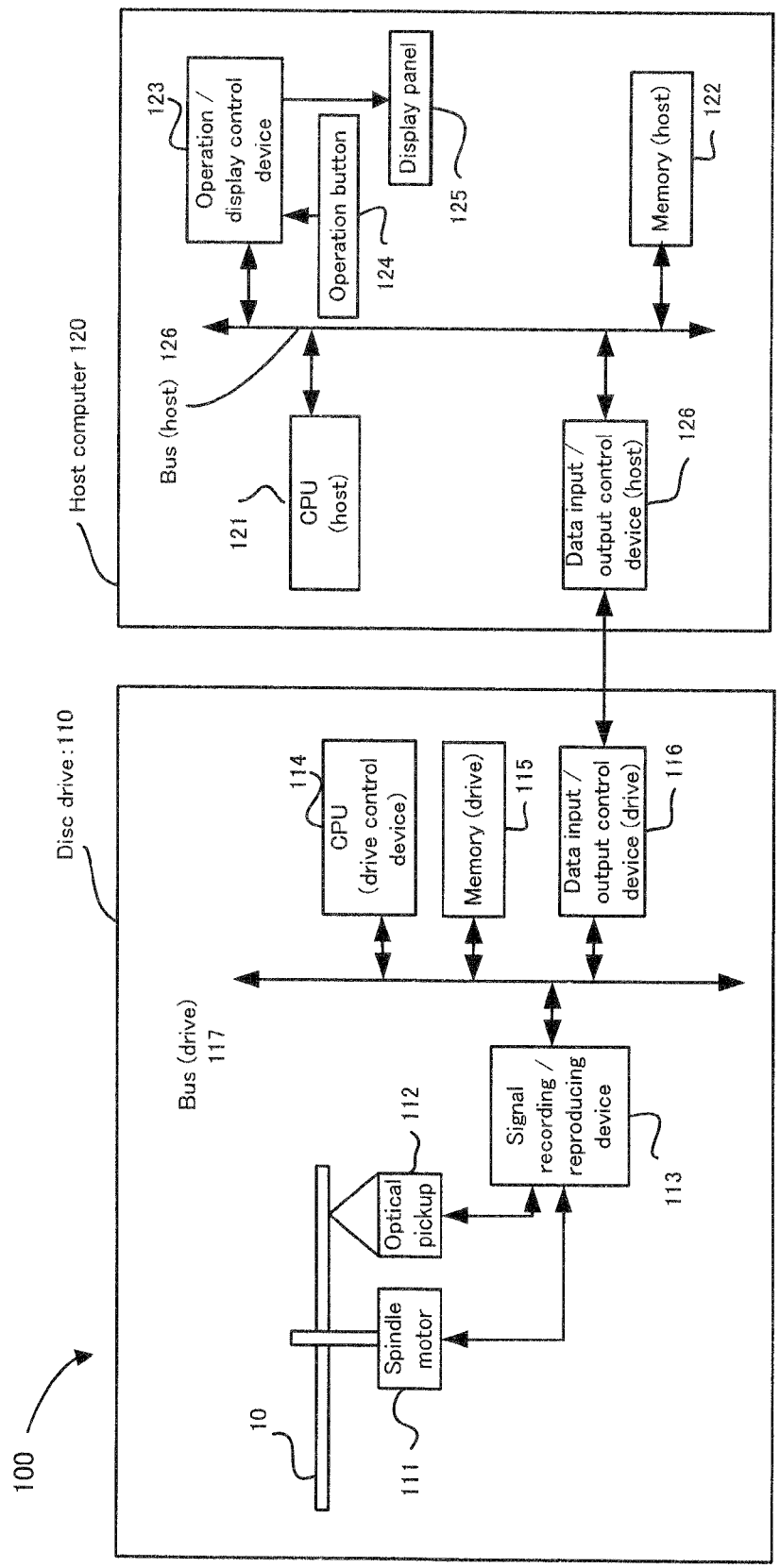

[FIG. 8]
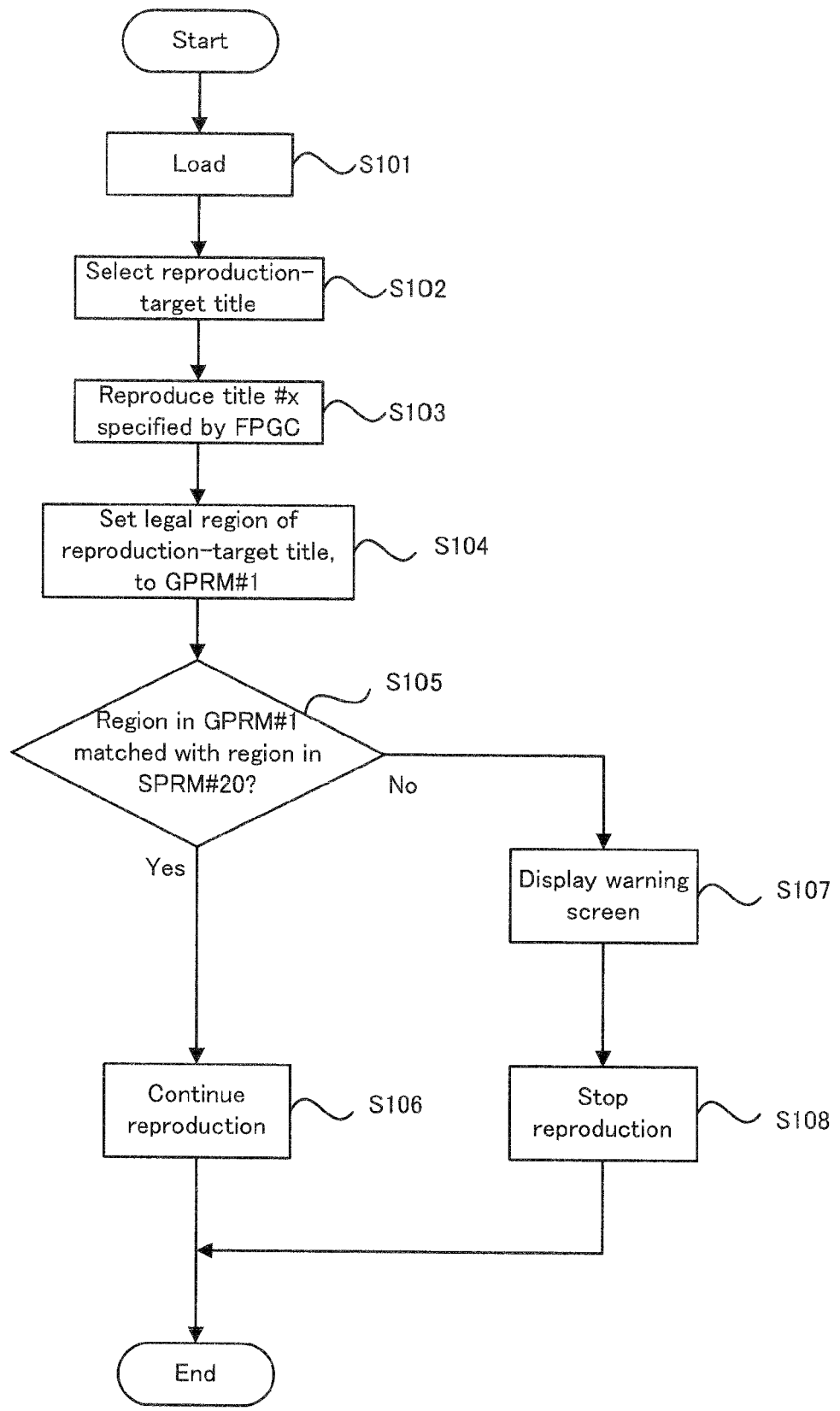

INFORMATION RECORDING MEDIUM, INFORMATION RECORDING DEVICE AND METHOD, AND COMPUTER PROGRAM

TECHNICAL FIELD

The present invention relates to an information recording medium such as a DVD, an information recording apparatus and method such as a DVD recorder, and a computer program which makes a computer function as such an information recording apparatus.

BACKGROUND ART

The DVD-Video standard is complied with, in the case where video information compression-coded by MPEG (Moving Picture Expert Group) 1 or MPEG 2, which is one example of compression-coding, is recorded onto an optical disc such as a DVD. According to the DVD-Video standard, the compression-coding and high-density recording of the record data have advanced to the extent that content information with a volume of about one movie can be recorded onto one optical disc. The DVD-Video standard is standardized mainly to prepare packaged software including the title of a movie or the like, and to sell the packaged software to users. On the other hand, since the DVD-Video standard is standardized mainly to record the read-only title, a users' arbitrary editing is restricted. In particular, the DVD-Video standard is not suited for such an application that users record the title such as a TV program, in which commercial messages (CM) and a main story are discretely arranged, while editing the CM. In addition, in the DVD-Video standard, the copy-once title broadcasted in terrestrial digital broadcasting and BS digital broadcasting cannot be recorded.

That is why the DVD-VR (Video Recording) standard, disclosed in a patent document 1, is standardized in addition to the DVD-Video standard. In the DVD-VR standard, users can record the title such as a TV program in which CM and a main story are discretely arranged, while editing the CM, or users can edit it after recording the title. In addition, the DVD-VR standard supports CPRM (Content Protection for Recordable Media) or the like, so that the copy-once title can be recorded. Thus, it is possible to preferably protect the copyright of the title to be recorded.

Moreover, a region code for restricting a reproducible area of recorded content is assigned to a DVD. Specifically, the world is divided into six regions (or seven regions if an airplane is considered to be one region), and a unique region code to each region is defined. One or a plurality of region codes are assigned to a DVD. Moreover, one region code is assigned to a DVD player for reproducing the DVD. Then, only if the region code assigned to the DVD matches the region code assigned to the DVD player, the DVD player can reproduce the content recorded on the DVD. For example, a region code "2" is assigned to both the DVD and the DVD player which are sold in Japan. Thus, the content recorded on the DVD sold in Japan can be reproduced by using the DVD player sold in Japan. On the other hand, a region code "1" is assigned to the DVD sold in America. Thus, the content recorded on the DVD sold in America cannot be reproduced by using the DVD player sold in Japan. Such DVD reproduction control is referred to as RPC (Region Playback Control) (refer to a patent document 1).

The patent document 1 discloses that the DVD player is controlled as follows. The region code indicating a country or region in which the DVD player is to be placed and operated is stored in the DVD player for reproducing the DVD, while the region code indicating a country or region which allows the reproduction of the title recorded on the DVD is recorded in the DVD in the manufacturing step. The region code stored in the DVD player on which the DVD is loaded is verified with the region code recorded on the DVD itself, and only when the both region codes match, the title reproduction is started.

Patent document 1: Japanese Patent Application Laid Open NO. 2004-127486

DISCLOSURE OF INVENTION

Subject to be Solved by the Invention

There has been a desire to develop such a distribution system that the title such as a movie is stored on a server on the Internet, that the title is distributed to users, and that the users record the distributed title onto optical discs. In particular, the distributed title tends to be a movie or the like that users do not have to edit. Thus, there has been a desire to develop such a distribution system that the title to be distributed is stored on the server in accordance with the DVD-Video standard and that the title according to the DVD-Video standard is distributed. At this time, in order to distinguish the so-called new type title distributed from the server from the so-called old type title, which is considered to be authorized in advance as the packaged software, the names of files or the like which constitute each title are preferably different.

If a plurality of titles are recorded onto the optical disc in the above manner, it is required to assign a different region code to each of the plurality of titles. However, in the existing DVD, one region code is assigned to one disc (in other words, one combination of region code is assigned), which causes such a technical problem that the different region code cannot be assigned. In particular, since CPR_MAI, which indicates the region code at a physical layer level, needs to match VMG_CAT, which indicates the region code at an application layer level, it is impossible to assign the different region code to each title.

Moreover, the same technical problem can arise not only in the DVD but also in various information recording media using the region code.

In view of the aforementioned problems, it is therefore an object of the present invention to provide an information recording medium, and an information recording apparatus and method, which allow preferable setting of the region code in a reproduction operation, in the plurality of titles to which the different region codes are assigned (i.e. set), and a computer program which makes a computer function as such an information recording apparatus.

Means for Solving the Subject

The above object of the present invention can be achieved by an information recording medium provided with: a first area in which first data is recorded, first data region information being assigned to the first data; a second area in which second data is recorded, second data region information which is different from the first data region information being assigned to the second data; and a control area in which control data including setting command data is recorded, the setting command data setting the first data region information as reference region information, which is referred to by an information reproducing apparatus, if the first data is reproduced.

The above object of the present invention can be also achieved by an information recording apparatus provided with: a first recording device for recording first data to which first data region information is assigned; a second recording device for recording second data to which second data region information which is different from the first data region information is assigned; and a third recording device for recording control data including setting command data, the setting command data setting the first data region information as reference region information, which is referred to by an information reproducing apparatus, if the first data is reproduced.

The above object of the present invention can be also achieved by an information recording method provided with: a first recording process of recording first data to which first data region information is assigned; a second recording process of recording second data to which second data region information which is different from the first data region information is assigned; and a third recording process of recording control data including setting command data, the setting command data setting the first data region information as reference region information, which is referred to by an information reproducing apparatus, if the first data is reproduced.

The above object of the present invention can be also achieved by a computer program for recording-control, to control a computer provided in an information recording apparatus provided with: a first recording device for recording first data to which first data region information is assigned; a second recording device for recording second data to which second data region information which is different from the first data region information is assigned; and a third recording device for recording control data including setting command data, the setting command data setting the first data region information as reference region information, which is referred to by an information reproducing apparatus, if the first data is reproduced, the computer program making the computer function as at least one portion of the first recording device, the second recording device, and the third recording device.

These effects and other advantages of the present invention will become more apparent from the embodiments explained below.

BRIEF DESCRIPTION OF DRAWINGS

FIG. 1 are a schematic plan view showing one basic structure of an optical disc in an example, and a schematic cross sectional view showing the optical disc and a schematic conceptual view showing a recording area structure in the radial direction associated with the cross sectional view.

FIG. 2 is a data structure diagram conceptually showing the basic data structure of content recorded on the optical disc.

FIG. 3 is a data structure diagram conceptually showing the basic data structure of VTS (Video Title Set), of the data structure of the content recorded on the optical disc.

FIG. 4 is a data structure diagram conceptually showing the basic data structure of VMG (Video Manager), of the data structure of the content recorded on the optical disc.

FIG. 5 is a timing chart conceptually showing PGC (Program Chain) for defining a reproduction unit of the content recorded on the optical disc.

FIG. 6 is a plan view showing a warning, which is displayed by a waning display cell.

FIG. 7 is a block diagram conceptually showing the basic structure of an information recording/reproducing apparatus in the example.

FIG. 8 is a flowchart conceptually showing a flow of the reproduction operation of the information recording/reproducing apparatus in the example.

DESCRIPTION OF REFERENCE CODES

10 optical disc
16 CPR_MAI
21 Video_DC directory
22 Video_TS directory
30 VTS
31 VTSI
32 VTSM_VOBS
33 VTS_VOBS
34 VTSI_BUPS
40 command information table
41 cell information table
42 pre-command table
43 post-command table
44 cell command table
50 VMG
51 VMGI
52 VMGM_VOBS
54 VMGI_BUPS
58 VMGI_CAT
59 FP_PGC
71 warning display cell
72 region setting command
73 reproduction stop command
100 information recording apparatus
200 communication network
300 distribution server
301 hard disk
112 optical disc
113 signal recording/reproducing device
121 CPU

BEST MODE FOR CARRYING OUT THE INVENTION

Hereinafter, as the best mode for carrying out the present invention, an explanation will be given on the embodiments of the information recording medium, the information recording apparatus and method, and the computer program of the present invention.

Embodiment of Information Recording Medium

An embodiment of the information recording medium of the present invention is an information recording medium provided with: a first area (e.g. a VIDEO_DC directory described later) in which first data (e.g. VIDEO_DC, VTS in VIDEO_DC, a title in VIDEO_DC, described later) is recorded, first data region information (in other words, a first region code) being assigned to the first data; a second area (e.g. a VIDEO_TS directory descried later) in which second data (e.g. VIDEO_TS, VTS in VIDEO_TS, a title in VIDEO_TS, described later) is recorded, second data region information (in other words, a second region code) which is different from the first data region information being assigned to the second data; and a control area in which control data including setting command data is recorded, the setting command data setting the first data region information as reference region information (e.g. GPRM #1 described later), which is referred to by an information reproducing apparatus, if the first data is reproduced.

According to the embodiment of the information recording medium of the present invention, the first data to which the first data region information is assigned and the second data to which the second data region information is assigned are recorded. In the embodiment, the first data region information is different from the second data region information.

In the embodiment, in particular, the control data is recorded. The control data includes the setting command data for setting the first data region information, if the first data is reproduced, as the reference region information which is referred to in the reproduction operation of the information reproducing apparatus for performing reproduction on the information recording medium.

By this, while satisfying such a requirement that the medium region information is recorded on the information recording medium, which is required in the standard of the information recording medium, as detailed later, the reproduction operation can be performed using the data region information of the data to be reproduced, in the data reproduction. That is, even if a plurality of data to each of which the different data region information is assigned are recorded, it is possible to set the data region information which is assigned to the data to be reproduced, as the reference region information, while satisfying the requirement in the standard of the information recording medium. By this, even if the plurality of data to each of which the different data region information is assigned are recorded, each of the data can be preferably reproduced.

As described above, according to the information recording medium in the embodiment, it is possible to preferably set the region information in the reproduction operation, with respect to the plurality of data to each of which the different data region information is assigned.

Incidentally, in the embodiment, the first area in which the first data is recorded may be physically distinguished from the second area in which the second data is recorded. For example, the first area may be disposed (i.e. the first data may be recorded) on the relatively inner circumferential side of the information recording medium, and the second area may be disposed (i.e. the second data may be recorded) on the relatively outer circumferential side of the information recording medium. Alternatively, the first area may be disposed (i.e. the first data may be recorded) on the relatively outer circumferential side of the information recording medium, and the second area may be disposed (i.e. the second data may be recorded) on the relatively inner circumferential side of the information recording medium. Alternatively, the first area in which the first data is recorded may be logically distinguished from the second area in which the second data is recorded. For example, while the first data and the second data are recorded in a shared position as the physical position, the information reproducing apparatus or the like may be able to logically distinguish the first data and the second data.

In one aspect of the embodiment of the information recording medium of the present invention, the control data includes operation command data, which controls an operation of reproducing the first data by the information reproducing apparatus, on the basis of each of the set first data region information (i.e. the reference region information) and apparatus region information which is assigned to the information reproducing apparatus.

According to this aspect, it is possible to control the operation of the information reproducing apparatus, on the basis of each of the first data region information, which is set as the reference region information, and the apparatus region information. For example, it is possible to allow the reproduction of the first data by the information reproducing apparatus only if the first data region information matches the apparatus region information, or it is possible to change an aspect of reproducing the first data in accordance with the apparatus region information.

In another aspect of the embodiment of the information recording medium of the present invention, the control data is set as data to be firstly reproduced when reproduction is performed on the information recording medium (or if the first data is reproduced).

According to this aspect, if the first data is reproduced, the control data is firstly reproduced or executed. Thus, the data region information, which is assigned to the first data to be reproduced, can be surely set as the reference region information.

In another aspect of the embodiment of the information recording medium of the present invention, the first data further includes sequence data (e.g. PGC described later) for defying a reproduction sequence of the first data, and the sequence data defines the control data as data to be firstly reproduced (e.g. defines it as the data to be firstly reproduced by FPGC described later).

According to this aspect, if the first data is reproduced, the control data is firstly reproduced or executed. Thus, the data region information, which is assigned to the first data to be reproduced, can be surely set as the reference region information.

In another aspect of the embodiment of the information recording medium of the present invention, the control data is command data (e.g. a cell command, a navigation command, or the like described later) included in the first data.

According to this aspect, if the first data is reproduced, the data region information, which is assigned to the first data, can be surely set as the reference region information.

In another aspect of the embodiment of the information recording medium of the present invention, the control data is recorded as pre-command information, which is executed by the information reproducing apparatus before all or a part of the first data is reproduced, or as post-command information, which is executed by the information reproducing apparatus after all or a part of the first data is reproduced.

According to this aspect, if the first data is reproduced, the data region information, which is assigned to the first data, can be surely set as the reference region information.

In another aspect of the embodiment of the information recording medium of the present invention, the control area is included in at least one of the first area and the second area.

According to this aspect, the control area can be disposed in at least one of the first area and the second area.

In another aspect of the embodiment of the information recording medium of the present invention, the control data includes (i) display data for displaying a warning which indicates that the information reproducing apparatus cannot reproduce the first data if the set first data region information does not match apparatus region information which is assigned to the information reproducing apparatus, and (ii) stop command data for stopping a reproduction operation of the information reproducing apparatus after the warning is displayed.

According to this aspect, if the first data region information set as the reference region information does not match the apparatus region information, the reproduction operation is stopped after the warning is displayed. Therefore, it is possible to prevent the reproduction operation by the information reproducing apparatus that is illegally remodeled.

In another aspect of the embodiment of the information recording medium of the present invention, the setting command data sets the second data region information as the reference region information if the second data is reproduced.

According to this aspect, while satisfying such a requirement that the medium region information is recorded on the information recording medium, which is required in the standard of the information recording medium, the reproduction operation can be performed using the data region information of the data to be reproduced, in the data reproduction. That is, in reproducing the first data, the first data region information can be set as the reference region information, and in reproducing the second data, the second data region information can be set as the reference region information. By this, even if the plurality of data to each of which the different data region information is assigned are recorded, it is possible to preferably reproduce each of the data.

In another aspect of the embodiment of the information recording medium of the present invention, it is further provided with: a title region area (e.g. VMGI_CAT described later) in which the first data region information and the second data region information are recorded; and a region recording area (e.g. CPR_MAI described later) in which medium region information is recorded, each of the first data region information and the second data region information being to be reflected in the medium region information, information recorded in the title region area and information recorded in the region rearing area being set equally.

According to this aspect, the medium region information is recorded on the information recording medium. The medium region information reflects each of the first data region information and the second region information. In other words, the medium region information is region information obtained by combining the first data region information and the second region information. That is, the medium region information is region information which includes all the data region information assigned to the data recorded on the information recording medium. Specifically, for example, if the first region information is "1" and the second data region information is "2 and 3", the medium region information is "1, 2, and 3".

Then, in the embodiment, the medium region information recorded in the region recording area is recorded in the title region area. That is, the information recorded in the title region area is the same as the information recorded in the region recording area.

By this, while satisfying such a requirement that the medium region information is recorded on the information recording medium, which is required in the standard of the information recording medium, the reproduction operation can be performed using the data region information of the data to be reproduced, in the data reproduction. That is, even if the plurality of data to each of which the different data region information is assigned are recorded, it is possible to set the data region information assigned to the data to be reproduced, as the reference region information, while satisfying the requirement in the standard of the information recording medium. By this, even if the plurality of data to each of which the different region information is assigned are recorded, it is possible to preferably reproduce each of the data.

Embodiment of Information Recording Apparatus

An embodiment of the information recording apparatus of the present invention is an information recording apparatus provided with: a first recording device for recording first data to which first data region information is assigned; a second recording device for recording second data to which second data region information which is different from the first data region information is assigned; and a third recording device for recording control data including setting command data, the setting command data setting the first data region infor-mation as reference region information, which is referred to by an information reproducing apparatus, if the first data is reproduced.

According to the embodiment of the information recording apparatus of the present invention, the first data is recorded onto the information recording medium by the operation of the first recording device. Moreover, the second data is recorded onto the information recording medium by the operation of the second recording device. Moreover, the control data is recorded onto the information recording medium by the operation of the third recording device.

By this, while satisfying such a requirement that one medium region information is recorded onto the information recording medium, which is required in the standard of the information recording medium, the reproduction operation can be performed using the data region information of the data to be reproduced, in the data reproduction. That is, even if the plurality of data to each of which the different data region information is assigned are recorded, it is possible to set the data region information assigned to the data to be reproduced, as the reference region information, while satisfying the requirement in the standard of the information recording medium. By this, even if the plurality of data to each of which the different region information is assigned are recorded, it is possible to preferably reproduce each of the data. That is, it is possible to receive the same effects as those of the embodiment of the information recording medium of the present invention described above.

Incidentally, in response to the various aspects in the embodiment of the information recording medium of the present invention described above, the embodiment of the information recording apparatus of the present invention can also adopt various aspects.

Embodiment of Information Recording Apparatus

An embodiment of the information recording method of the present invention is an information recording method provided with: a first recording process of recording first data to which first data region information is assigned; a second recording process of recording second data to which second data region information which is different from the first data region information is assigned; and a third recording process of recording control data including setting command data, the setting command data setting the first data region information as reference region information, which is referred to by an information reproducing apparatus, if the first data is reproduced.

According to the embodiment of the information recording method of the present invention, it is possible to receive the same benefits as those of the embodiment of the information recording apparatus of the present invention described above.

Incidentally, in response to the various aspects in the embodiment of the information recording apparatus of the present invention described above, the embodiment of the information recording method of the present invention can also adopt various aspects.

Embodiment of Computer Program

An embodiment of the computer program of the present invention is a computer program for recording-control to control a computer provided in an information recording apparatus provided with: a first recording device for recording first data to which first data region information is assigned; a second recording device for recording second data to which second data region information which is different from the first data region information is assigned; and a third recording device for recording control data including setting command data, the setting command data setting the first data region information as reference region information, which is referred to by an information reproducing apparatus, if the first data is reproduced (i.e. the embodiment of the information recording apparatus of the present invention described above (including its various aspects)), the computer program making the computer function as at least one portion of the first recording device, the second recording device, and the third recording device.

According to the computer program of the present invention, the embodiment of the information recording apparatus of the present invention described above can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the information recording apparatus of the present invention described above, the embodiment of the computer program of the present invention can also adopt various aspects.

The above object of the present invention can be also achieved by a computer program product in a computer-readable medium for tangibly embodying a program of instructions executable by a computer provided in an information recording apparatus provided with: a first recording device for recording first data to which first data region information is assigned; a second recording device for recording second data to which second data region information which is different from the first data region information is assigned; and a third recording device for recording control data including setting command data, the setting command data setting the first data region information as reference region information, which is referred to by an information reproducing apparatus, if the first data is reproduced (i.e. the embodiment of the information recording apparatus of the present invention described above (including its various aspects)), the computer program produce making the computer function as at least one portion of the first recording device, the second recording device, and the third recording device.

According to the embodiment of the computer program product of the present invention, the embodiment of the information recording apparatus of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the embodiment of the information recording apparatus of the present invention described above.

Incidentally, in response to the various aspects in the embodiment of the information recording apparatus of the present invention described above, the embodiment of the computer program product of the present invention can also adopt various aspects.

These effects and other advantages of the present invention will become more apparent from the example explained below.

As explained above, according to the embodiment of the information recording medium of the present invention, it is provided with the first area in which the first data is recorded, the second area in which the second data is recorded, and the control area in which the control data is recorded. According to the embodiment of the information recording apparatus of the present invention, it is provided with the first recording device for recording the first data, the second recording device for recording the second data, and the third recording device for recording the control data. According to the embodiment of the information recording method of the present invention, it is provided with the first recording process of recording the first data, the second recording process of recording the second data, and the third recording process of recording the control data. According to the computer program of the present invention, it makes a computer function as the first recording device, the second recording device, and the third recording device. Therefore, it is possible to preferably set the region information in the reproduction operation, for the plurality of titles to each of which the different region code is assigned.

Example

Hereinafter the example of the present invention will be explained with reference to the drawings.

(1) Information Recording Medium

Firstly, with reference to FIG. 1, an explanation will be given on an optical disc as an embodiment of the information recording medium of the present invention. FIG. 1(*a*) is a schematic plan view showing one basic structure of the optical disc in the example, and FIG. 1(*b*) is a schematic cross sectional view showing the optical disc and a schematic conceptual view showing a recording area structure in the radial direction associated with the cross sectional view.

As shown in FIG. 1(*a*) and FIG. 1(*b*), an optical disc 10 in the example has a recording surface on a disc main body with a diameter of about 12 cm, as in a DVD, for example. On the recording surface, the optical disc 10 is provided with: a center hole 11 as the center; a lead-in area 12; a data area 15, and a lead-out area 18. Moreover, the optical disc 10 has a recording layer or the like laminated on a transparent substrate 13. In each recording area of the recording layer, tracks such as a groove track and a land track are alternately provided, spirally or concentrically, centered on the center hole 11. Moreover, on the tracks, data is divided and recorded by a unit of ECC block. The ECC block is a data management unit by which the data can be error-corrected.

Moreover, the lead-in area 12 is provided therein with a CPR_MAI 16, which constitutes one specific example of the "region recording area" of the present invention. In the CPR_MAI 16, a disc region code described later is to be recorded.

Incidentally, the optical disc 10 in the example is not limited to the optical disc provided with the single recording layer as shown in FIG. 1(*a*) and FIG. 1(*b*), but may be an optical disc provided with a plurality of recording layers.

(2) Data Structure on Information Recording Medium

Next, with reference to FIG. 2 to FIG. 6, an explanation will be given on the logical data structure (in other words, file structure) of content recorded on the optical disc 10. FIG. 2 is a data structure diagram conceptually showing the basic data structure of the content recorded on the optical disc 10. FIG. 3 is a data structure diagram conceptually showing the basic data structure of VTS (Video Title Set), of the data structure of the content recorded on the optical disc 10. FIG. 4 is a data structure diagram conceptually showing the basic data structure of VMG (Video Manager), of the data structure of the content recorded on the optical disc 10. FIG. 5 is a timing chart conceptually showing PGC (Program Chain) for defining a reproduction unit of the content recorded on the optical disc 10. FIG. 6 is a plan view showing a warning, which is displayed by a waning display cell.

Incidentally, the following explanation focuses a specific example in which the optical disc 10 complies with the DVD standard. Therefore, the same structure as the DVD standard will be omitted in the detailed explanation, in order to simplify the explanation. Moreover, the content recorded on the optical disc 10 is preferably compressed in accordance with, for example, the MPEG (Moving Picture Expert Group) method.

As shown in FIG. 2, the content recorded on the optical disc 10 includes: a Video_DC directory 21 (one specific example of the "first data" of the present invention), including n VTSs (Video Title Sets) 30 (wherein n is an integer of 1 or more but not exceeding 99) and one VMG (Video Manager) 50; and a Video_TS directory 22 (one specific example of the "second data" of the present invention), including n VTSs 30 (wherein n is an integer of 1 or more but not exceeding 99) and one VMG 50, under a root Directory.

Incidentally, the VTS 30 is, for example, one movie or one TV program, and is one set (or unity) of related titles (i.e. having the same attribute such as the number, specification, and correspondence language of audio information and sub-picture information included in the one movie or TV program). Moreover, the VMG 50 is information (e.g. data, a data list, a data file or data table, or a menu about all the VTSs 30 managed by the VMG 50 (hereinafter referred to as a "general menu")) for managing the VTSs 30 included in the content with the VMG 50. Specifically, the VMG 50 included in the Video_DC directory 21 is information for managing the VTSs 30 included in the Video_DC directory 21, and the VMG 50 included in the Video_TS directory 22 is information for managing the VTSs 30 included in the Video_TS directory 22.

Moreover, the Video_DC directory 21 is a so-called new type directory in which the content is recorded when the content according to the DVD-Video standard is downloaded from a server and recorded onto the optical disc 10. On the other hand, the Video_TS directory 22 is a so-called old type directory in which the content is recorded as the packaged software authored by an author, for example. However, in the example, the substantial content (i.e. a movie or the like) is not recorded in the Video_TS directory 22, and as described later, data for displaying a warning which indicates that the optical disc 10 cannot be reproduced and for stopping a reproduction operation is recorded, with respect to an information reproducing apparatus which cannot recognize the Video_DC directory 21 but can recognize the Video_TS directory 22.

Moreover, the data structure of the VTS 30 included in the Video_DC directory 21 and the data structure of the VTS 30 included in the Video_TS directory 22 are basically the same. Of course, they may include a partially different portion. The VTS 30 included in the Video_DC directory 21 and the VTS 30 included in the Video_TS directory 22 can be distinguished in accordance with which directory the VTS 30 is recorded in. Moreover, as described later, they can be distinguished by the identifier of a file which constitutes each VTS 30. In the same manner, actually, the data structure of the VMG 50 included in the Video_DC directory 21 and the data structure of the VMG 50 included in the Video_TS directory 22 are basically the same. Of course, they may include a partially different portion. The VMG 50 included in the Video_DC directory 21 and the VMG 50 included in the Video_TS directory 22 can be distinguished in accordance with which directory the VMG 50 is recorded in. Moreover, as described later, they can be distinguished by the identifier of a file which constitutes each VMG 50.

Incidentally, the term "Video_DC" is used in the example, but the term indicates in effect a type that is newly suggested with respect to the so-called old type (or guide line, or format) "Video_TS". The "Video_DC" is used when the content according to the DVD-Video standard and encrypted by the CPRM or the like is accumulated on the server and the accumulated content is distributed to users through a network. In other words, the "Video_DC" is a new type used to perform an operation that cannot be performed using the old type "Video_TS" or that has not been considered. Of course, the content of the "Video_TS" can be distributed to the users through the network, but this is an aspect of distributing the content according to the old type and is different from the distribution of the content by the "Video_DC". As described above, the "Video_DC" indicates in effect the new type different from the old type "Video_TS", so that the term may be arbitrarily defined. That is, even if the term of "Video_DC" is changed, it will be understood that the information recording medium after the term change is also included in the scope of the example.

As shown in FIG. 3, the VTS 30 includes: VTSI (VTS Information) 31; VTSM_VOBS (Video Object Set for the VTS Menu) 32; VTS_VOBS (Video Object Set for Titles in a VTS) 33; and VTSI_BUPS (VTSI Back Up) 34.

The VTSI 31 is management information for managing the VTS 30. The VTSI 31 in the VTS 30 included in the Video_DC directory 21 is provided with one file of "VTS_# #_0.IDC". The VTSI 31 in the VTS 30 included in the Video_TS directory 22 is provided with one file of "VTS_# #_0.IFO". Incidentally, "# #" is an identification number of the VTS, and an integer of 1 or more (but the upper limit may be set, for example, to 99) is sequentially assigned to "# #" in accordance with the number of the VTSs 30 included in the content.

The VTSM_VOBS 32 is data for various menus about the VTS 30 (hereinafter such a menu is referred to as a "title menu" as occasion demands). The VTSM_VOBS 32 in the VTS 30 included in the Video_DC directory 21 is provided with one file of "VTS_# #_0.VDC". The VTSM_VOBS 32 in the VTS 30 included in the Video_TS directory 22 is provided with one file of "VTS_# #_0.VOB".

Incidentally, the "title menu" in the example means in effect a menu having a function of setting a reproduction condition (e.g. selecting an audio language in the reproduction, or selecting a sub-picture language (e.g. subtitle language) in the reproduction) of one title selected using the general menu described later. The title menu is distinguished from general menu information about the entire content described later (e.g. a menu or the like having a function for selecting desired title information from a plurality of title information included in a content group and giving an instruction to reproduce the selected desired title information). Incidentally, if the "title menu" is expressed by a term that is more faithful to the function, the "title menu" can be referred to as a "title reproduction status selecting menu (or a title reproduction condition selecting menu)". In the example, however, the explanation goes on with it referred to as the "title menu".

The VTS_VOBS 33 is entity information for actually reproducing the title. The VTS_VOBS 33 in the VTS 30 included in the Video_DC directory 21 is provided with one or a plurality of files of "VTS_# #_@.VDC". The VTS_VOBS 33 in the VTS 30 included in the Video_TS directory 22 is provided with one or a plurality of files of "VTS_# #_@.VOB". Incidentally, "@" is a serial number according to the number of files, and an integer of 1 or more (wherein the upper limit may be set, for example, to 9) is sequentially assigned to "@" in accordance with the number of the files included in one VTS_VOBS 33.

In particular, in the example, the VTS_VOBS 33 includes a warning display cell 71 (one specific example of the "display data" of the present invention) for displaying such a warning as shown in FIG. 6, which warns of an impossible reproduction operation by the information reproducing apparatus, as a title #x (wherein, x is an integer of 1 or more). The PGC used to reproduce the warning display cell 71 is preferably one simple and sequential PGC.

The VTSI_BUPS 34 is the back up of the VTSI 31. The VTSI_BUPS 34 in the VTS 30 included in the Video_DC directory 21 is provided with one file of "VTS_##_0.BDC". The VTSI_BUPS 34 in the VTS 30 included in the Video_TS directory 22 is provided with one file of "VTS_##_0.BUP".

The VTSI 31 is provided with: VTSI general information 35 for managing the entire VTSI 31; a PGCI table 36 including PGCI (#y (wherein y is an integer of 1 or more)) (Program Chain Information #y) 38 for specifying the data to be reproduced of the VTS 30; and other information 37.

The PGCI (#y) 38 includes: PGCI (#y) general information 39 for managing the entire PGCI (#y) 38; a command information table 40; a cell information table 41 including information about a cell, which is a reproduction unit specified by the PGCI (#y) 38; and other information 42.

The command information table 40 includes: a pre-command table 43 for specifying a pre-command executed before the reproduction of the data specified by the PGCI (#y) 38; a post-command table 44 for specifying a post-command executed after the reproduction of the data specified by the PGCI (#y) 38; and a cell command table 45 for specifying a cell command executed after the reproduction of the cell specified by the PGCI (#y) 38.

In particular, in the example, at least one of the pre-command table 43, the post-command table 44, and the cell command table 45, which are included in the command information table 40, includes a region setting command 72 (one specific example of the "setting command data" of the present invention) for setting a region code in the reproduction of the optical disc 10 by the information reproducing apparatus. In particular, the region setting command 72 is associated with the aforementioned title #x. That is, the region setting command 72 is set as a command executed in the reproduction of the aforementioned title #x. In particular, the region setting command 72 is preferably set as the pre-command executed before the reproduction of the title #x.

Moreover, at least one of the pre-command table 43, the post-command table 44, and the cell command table 45, which are included in the command information table 40, includes a reproduction stop command 73 (one specific example of the "stop command data" of the present invention) for stopping the reproduction operation, for example, several seconds after the start of the reproduction of the warning display cell 71. In particular, the reproduction stop command 73 is associated with the aforementioned title #x. That is, the reproduction stop command 73 is set as a command executed in the reproduction of the aforementioned title #x.

The operation by the region setting command 72 and the reproduction stop command 73 will be detailed later (refer to FIG. 8).

As shown in FIG. 4, the VMG 50 includes: VMGI (VMG Information) 51; VMGM_VOBS (Video Object Set for the VMG Menu) 52; and VMGI_BUPS (VMGI Back Up) 54.

The VMGI 51 is management information for managing the entire content including the VMG 50. The VMAGI 51 in the VTS 30 included in the Video_DC directory 21 is provided with one file of "VIDEO_TS.IDC". The VMGI 51 in the VTS 30 included in the Video_TS directory 22 is provided with one file of "VIDEO_TS.IFO".

The VMGM_VOBS 52 is data for the general menu about the entire content including the VMG 50 (e.g. a menu for selecting the desired title from the plurality of titles). The VMGM_VOBS 52 in the VTS 30 included in the Video_DC directory 21 is provided with one file of "VIDEO_TS.VDC". The VMGM_VOBS 52 in the VTS 30 included in the Video_TS directory 22 is provided with one file of "VIDEO_TS.VOB".

The VMGI_BUPS 54 is the back up of the VMGI 51. The VMGI_BUPS 54 in the VTS 30 included in the Video_DC directory 21 is provided with one file of "VIDEO_TS.BDC". The VMGI_BUPS 54 in the VTS 30 included in the Video_TS directory 22 is provided with one file of "VIDEO_TS.BUP".

The VMGI 51 includes: VMG general information 55 for managing the entire VMGI 51; and other information 57 including a title search pointer or the like, which indicates an address to record the head PGC of a title #1 (wherein 1 is an integer of 1 or more) included in the content recorded on the optical disc 10.

The VMG general information 55 includes: VMGI_CAT 58 in which the disc region code recorded in the CPR_MAI 16 described above is recorded; FP_PGC 59 for specifying the data to be firstly reproduced in the reproduction of the optical disc 10; and other information 60 including the disc region or the like.

The VMGI_CAT 58 constitutes one specific example of the "region recording area" of the present invention, and the disc region code is recorded in the VMGI_CAT 58.

Incidentally, in the example, the region code can be assigned to each directory or each title. For example, the region code "1" may be assigned to the Video_DC directory 21, and the region code "2" may be assigned to the Video_TS directory 22. In this case, the disc region code is "1 and 2". On the other hand, the region code "1" may be assigned to the title #1 in the VTS #1 in the Video_DC directory 21, the region code "2" may be assigned to the title #2 in the VTS #1 in the Video_DC directory 21, the region codes "3 and 4" may be assigned to the title #1 in the VTS #1 in the Video_TS directory 22, and the region code "5" may be assigned to the title #2 in the VTS #1 in the Video_TS directory 22. In this case, the disc region code is "1, 2, 3, 4, and 5". As described above, the disc region code is the code obtained by combining all the individual region codes assigned to respective directories or titles recorded on the optical disc 10.

However, if the optical disc 10 is a recordable type optical disc such as a DVD-R, it is not clear what type of directory or title, to which what type of region code is assigned, is recorded on the optical disc, until the directory, the VTS 30, or the title is actually recorded. Moreover, in the DVD-R or the like, the aforementioned CPR_MAI 16 is standardized to be a reserved area in advance in accordance with the standard. Therefore, in the optical disc 10 which is considered such that the user records the directory, the VTS 30, or the title, the disc region is preferably region all (in other words, region free). In this case, the disc region code of region all is also recorded in the VMGI_CAT 58.

Incidentally, the region setting command 72 is constructed such that the individual region code assigned to each directory or title can be identified in each directory or title. Therefore, by that the region setting command 72 is executed, the region code according to the directory or title, which is a reproduction target, is set as the region code referred to by the information reproducing apparatus.

The FP_PGC 59 constitutes one specific example of the "sequence data" of the present invention and specifies the data (specifically, the PGC) to be reproduced after the optical disc 10 is loaded on the information reproducing apparatus. In particular, in the example, the FP_PGC 59 specifies the title #x of the aforementioned VTS_VOBS 33.

On the optical disc 10 having such a data structure, the data is reproduced in the order shown in FIG. 5. As shown in FIG. 5, the content recorded on the optical disc 10 is reproduced mainly by a unit of PGC. The PGC corresponds to a combination of the PGCI 38 and data itself specified by the PGCI 38. It will be understood that the data specified by the PGCI 36 in the PGCI table 36 is reproduced after the reproduction of the data specified by the FP_PGC 59.

When one PGC is reproduced, firstly, setting information of the PGC (e.g. PGCI general information or the like) is obtained, and the pre-command specified by the pre-command table 43 is executed. After that, the content is reproduced by a unit of cell specified by the PGCI 38. The cell is a combination of navi packs and data controlled in reproduction by the navi packs (e.g. a video pack, an audio pack, a sub-picture pack, or the like).

The navi pack can specify a navigation command and can execute the navigation command before the data reproduction. For the navigation command, a command to perform a predetermined process after a certain time can be set. Specifically, a button command for displaying a transparent button, which is not displayed on a display, is set in the navigation command, and if the button command is not selected nor executed for a certain time, the predetermined process can be automatically performed.

After the reproduction of one cell is ended, the cell command specified by the cell command table 45 is executed. Then, the next PGC reproduction is performed in the same manner.

Incidentally, the example shown in FIG. 5 that one PGC includes one cell has been explained; however, it will be understood that one PGC may include a plurality of cells. In this case, after the reproduction of one cell is finished (i.e. after the cell command is executed), the next cell is executed in the same manner as described above, sequentially. After the reproduction of the last cell included in one PGC is ended, the post-command specified by the post-command table 44 is executed. Then, the next PGC reproduction is performed in the same manner.

(3) Information Recording/Reproducing Apparatus

Next, with reference to FIG. 7 and FIG. 8, an information recording/reproducing apparatus 100 in the example will be explained. FIG. 7 is a block diagram conceptually showing the basic structure of the information recording/reproducing apparatus 100 in the example.

As shown in FIG. 7, the information recording/reproducing apparatus 100 is provided with: a disc drive 110 on which the optical disc 10 is actually loaded and on which the data is recorded and reproduced; and a host computer 120, such as a personal computer, for controlling the recording and reproduction of the data on the disc drive 110.

The disc drive 110 is provided with: the optical disc 10; a spindle motor 111; an optical pickup 112; a signal recording/reproducing device 113; a CPU (drive control device) 114; a memory 115; a data input/output control device 116; and a bus 117. Moreover, the host computer 120 is provided with: a CPU 121; a memory 122; an operation/display control device 123; an operation button 124; a display panel 125; a data input/output control device 126; and a bus 127.

The spindle motor 111 is intended to rotate and stop the optical disc 10, and operates upon accessing the optical disc.

More specifically, the spindle motor 111 is constructed to rotate the optical disc 10 at a predetermined speed and stop it, under spindle servo from a not-illustrated servo unit or the like.

The optical pickup 112 is provided with a semiconductor laser device, a collimator lens, an objective lens, and the like, which are not illustrated, in order to perform the recording/reproduction with respect to the optical disc 10. More specifically, the optical pickup 112 irradiates the optical disc 10 with a light beam such as a laser beam, as reading light with a first power upon reproduction, and as writing light with a second power upon recording, with it modulated.

The signal recording/reproducing device 113 constitutes one specific example of the "first recording device", the "second recording device", the "third recording device", and the "fourth recording device" of the present invention. The signal recording/reproducing device 113 controls the spindle motor 111 and the optical pickup 112 under the control of the CPU 114, to thereby perform the recording and the reproduction with respect to the optical disc 10. More specifically, the signal recording/reproducing device 113 is provided with a laser diode (LD) driver, a head amplifier, and so on, for example. The LD driver generates, for example, a driving pulse and drives the semiconductor laser device located in the optical pickup 112. The head amplifier amplifies the output signal of the optical pickup 112, namely, the reflected light of a light beam, and outputs the amplified signal.

The CPU (drive control device) 114 is connected to the signal recording/reproducing device 113 and the memory 115 via the bus 117, and controls the entire disc drive 110 by giving an instruction to various controlled devices. In general, software for operating the CPU 114 or firmware is stored in the memory 115.

The memory 115 is used in the general data processing on the disc drive 110, including a buffer area for the record and reproduction data, an area used as an intermediate buffer when data is converted into the data that can be used on the signal recording device 113, and the like. Moreover, the memory 115 is provided with: a Read Only Memory (ROM) area into which a program for performing an operation as a recording device, namely, a firmware program is stored; and a Random Access Memory (RAM) area in which the record data is temporarily stored or in which a parameter required for the operation of a firmware program or the like is stored; and the like.

The data input/output control device 116 controls the input/output of the data from the exterior with respect to the disc drive 110. A drive control command, issued from the external host computer 120 which is connected with the disc drive 110 through an interface, such as a SCSI (Small Computer System Interface) and an ATAPI (AT Attachment Packet Interface), is transmitted to the CPU 114 through the data input/output control device 116. Moreover, the record data is exchanged with the host computer 120 through the data input/output control device 116 in the same manner.

The operation/display control device 123 receives an operation instruction and performs display with respect to the host computer 120, and transmits various instructions by the operation button 124 (e.g. an instruction to start the recording and an instruction to stop the recording) to the CPU 121. The CPU 121 transmits a control command to the disc drive 110 through the data input/output control device 126 on the basis of instruction information from the operation/display control device 123 and controls the entire disc drive 110. In the same manner, the CPU 121 can transmit a command to request the transmission of an operation state to the host computer 120, with respect to the disc drive 110. By this, the operation state of the disc drive 110 (e.g. a recording execution state and a recording stopping state) can be recognized, so that the CPU 121 can output the operation state of the disc drive 110 to the display panel 125, such as a fluorescent tube and a LCD, through the operation/display control device 123.

The CPU 121 controls the entire host computer 120.

The memory 122 is an internal storage apparatus used by the host computer 120. The memory 122 is provided with: ROM area into which a firmware program, such as a BIOS (Basic Input/Output System), is stored; a RAM area into which parameters required for an operating system and the operation of an application program or the like are stored; and the like.

The information recording/reproducing apparatus 100 having such a structure records the data onto the optical disc 10 such that the data has the data structure explained in FIG. 1 to FIG. 6 described above.

Next, with reference to FIG. 8, an explanation will be given on the reproduction operation of the optical disc 10 by the information recording/reproducing apparatus 100. FIG. 8 is a flowchart conceptually showing a flow of the reproduction operation of the information recording/reproducing apparatus 100 in the example.

As shown in FIG. 8, if the optical disc 10 is loaded on the information recording/reproducing apparatus 100 (step S101), the reproduction-target title (or directory, or VTS 30) is selected by the user (step S102).

After that, the title #x specified by the FP_PGC 59 is firstly reproduced (step S103). Here, in the example, since the region setting command 72 is set as the pre-command, the region setting command 72 is executed.

The region setting command 72 sets the region code in the reproduction of the optical disc 10 by the information recording/reproducing apparatus 100. Specifically, the region code which is originally assigned to the reproduction-target title selected in the step S102 is set in GPRM (General Parameter) #1 in the memory 115 or 122 of the information recording/reproducing apparatus 100. The region code set in the GPRM #1 is actually referred to by the information recording/reproducing apparatus 100 in the reproduction of the optical disc 10. At the same time, an equipment region code assigned to the information recording/reproducing apparatus 100 is set in SPRM (System Parameter) #20 in the memory 115 or 122 of the information recording/reproducing apparatus 100.

Incidentally, the GPRM is a parameter temporarily used by the information recording/reproducing apparatus 100. In the example, the GPRM #1 of the GPRM is used to set the region code which is originally assigned to the reproduction-target title. On the other hand, the SPRM is a parameter fixedly used by the information recording/reproducing apparatus 100. In the example, the SPRM #20 of the SPRM is used to set the equipment region code.

Then, using the pre-command, the cell command, the post-command or the like included in the title #x, it is judged whether or not the region code set in the GPRM #1 matches the equipment region code set in the SPRM #20 (step S105).

As a result of the judgment in the step S105, if it is judged that the region code set in the GPRM #1 matches the equipment region code set in the SPRM #20 (the step S105: Yes), the reproduction operation is continued (step S106). That is, the title selected in the step S102 is reproduced.

On the other hand, as a result of the judgment in the step S10, if it is judged that the region code set in the GPRM #1 does not match the equipment region code set in the SPRM #20 (the step S105: No), the warning display cell 71 is reproduced using the pre-command, the cell command, the post-command or the like included in the title #x (step S107). The warning display cell 71 may be a still image which shows a warning of "Warning. This disc cannot be reproduced by your player. Please reproduce it with a corresponding player", as shown in FIG. 6. Alternatively, it may be a motion picture or sound, as long as it can present that the loaded optical disc 10 cannot be reproduced to the user.

After the reproduction of the warning display cell 71, the reproduction operation of the information recording/reproducing apparatus 100 is stopped by the reproduction stop command 73, which is set in the pre-command, the cell command, the post-command, or the like included in the title #x (step S108).

As explained above, according to the example, while the plurality of titles (or directories) to which the different region codes are assigned is recorded onto one optical disc 10, the region code of the reproduction-target title can be set in the GPRM #1 every time the reproduction-target title is selected. In particular, while satisfying such a requirement that the same disc region code is recorded into the CPR_MAI 16 and the VMGI_CAT 58, which is required in the DVD standard, the region code of the reproduction-target title can be set in the GPRM #1. By this, it is possible to reproduce each of the plurality of titles to which the different region codes are assigned, using the individual region codes.

In addition, as a result of the region check, if it is judged that the optical disc 10 cannot be reproduced, the warning display cell 71 is reproduced. The warning display cell 71 may be a still image which shows a warning of "Warning. This disc cannot be reproduced by your player. Please reproduce it with a corresponding player", as shown in FIG. 6. Alternatively, it may be a motion picture or sound, as long as it can present that the loaded optical disc 10 cannot be reproduced to the user. By this, the user can preferably recognize that the loaded optical disc 10 cannot be reproduced. Then, since the reproduction stop command 73 allows the reproduction operation of the information recording/reproducing apparatus 100 to be forcibly stopped after the display of the warning, it is possible to preferably prevent such a disadvantage that an illegal reproduction operation is performed.

Incidentally, in the aforementioned example, an explanation is given on the optical disc 10 on which the Video_DC directory 21 and the Video_TS directory 22 are recorded. However, it will be understood that the present invention is not limited to this. For example, it may be an optical disc on which only the Video_DC directory 21 is recorded, or an optical disc on which only the Video_TS directory 22 is recorded. Alternatively, moreover, it may be an optical disc on which another type of data is recorded. The point is that the aforementioned various effects can be preferably received by adopting the aforementioned structure for the optical disc on which the plurality of data (e.g. directory, VTS, title, other various contents, and the like) to which the different region codes are assigned are recorded.

Moreover, in the aforementioned example, an explanation is given on such a structure that the warning display cell 71, the region setting command 72, and the reproduction stop command 73 are included in the title #x specified by the FP_PGC 59. However, in addition or instead of such a structure that the warning display cell 71, the region setting command 72, and the reproduction stop command 73 are included, the FPGC 59 may specify the VMGM_VOBS 52 and the VTSM_VOBS 32 (in particular, the head PGC) which are different from the title #x. In this case, VMGM_VOBS 52 and the VTSM_VOBS 32 (in particular, the head PGC) have the same structure as the title #x. Alternatively, in addition to or instead of those structures, each of the plurality of titles (or directories, VTSs 30, or the like) may have the same structure as the title #x. In this case, the aforementioned region setting command 72 is preferably set in a navi command of the head PGC of each title. Since the region setting command 72 is executed even in such a structure, the aforementioned various effects can be preferably received.

Incidentally, in the aforementioned examples, the optical disc 10 is explained as one example of the information recording medium, and the recorder and the player related to the optical disc 100 are explained as one example of the information recording apparatus and the information reproducing apparatus. The present invention, however, is not limited to the optical disc and the recorder and player thereof, and can be applied to other various information recording media which support high-density recording or a high transfer rate, and recorders and players thereof.

The present invention is not limited to the aforementioned embodiment, but various changes may be made, if desired, without departing from the essence or spirit of the invention which can be read from the claims and the entire specification. An information recording medium, an information recording apparatus and method, and a computer program, all of which involve such changes, are also intended to be within the technical scope of the present invention.

The invention claimed is:

1. An information recording medium comprising:
a first area in which first data is recorded, first data region information being assigned to the first data;
a second area in which second data is recorded, second data region information which is different from the first data region information being assigned to the second data;
a control area in which control data including setting command data is recorded, the setting command data setting the first data region information as reference region information, which is referred to by an information reproducing apparatus, if the first data is reproduced and setting the second data region information as the reference region information if the second data is reproduced; and
a region recording area in which medium region information is recorded, each of the first data region information and the second data region information being to be reflected in the medium region information,
the first data region information is a region code for restricting a reproducible area of the first data,
the second data region is a region of code for restricting a reproducible area of the second data, and
the first data or the second data to be reproduced is reproducible if the first data region information or the second data region information set as the reference region information matches equipment region information being assigned to the information reproducing apparatus.

2. The information recording medium according to claim 1, wherein the control data includes operation command data, which controls an operation of reproducing the first data by said information reproducing apparatus on the basis of each of the set first data region information and apparatus region information which is assigned to said information reproducing apparatus.

3. The information recording medium according to claim 1, wherein the control data is set as data to be firstly reproduced when reproduction is performed on said information recording medium.

4. The information recording medium according to claim 1, wherein
the first data further includes sequence data for defining a reproduction sequence of the first data, and
the sequence data defines the control data as data to be firstly reproduced.

5. The information recording medium according to claim 1, wherein the control data is recorded as pre-command information, which is executed by said information reproducing apparatus before all or a part of the first data is reproduced, or as post-command information, which is executed by said information reproducing apparatus after all or a part of the first data is reproduced.

6. The information recording medium according to claim 1, wherein the control area is included in at least one of said first area and said second area.

7. The information recording medium according to claim 1, wherein the control data includes (i) display data for displaying a warning which indicates that said information reproducing apparatus cannot reproduce the first data if the set first data region information does not match apparatus region information which is assigned to said information reproducing apparatus, and (ii) stop command data for stopping a reproduction operation of said information reproducing apparatus after the warning is displayed.

8. The information recording medium according to claim 1, further comprising:
a title region area in which the first data region information and the second data region information are recorded,
information recorded in said title region area and information recorded in said region rearing area being set equally.

9. An information recording method comprising:
a first recording process of recording first data to which first data region information is assigned;
a second recording process of recording second data to which second data region information which is different from the first data region information is assigned;
a third recording process of recording control data including setting command data, the setting command data setting the first data region information as reference region information, which is referred to by an information reproducing apparatus, if the first data is reproduced and setting the second data region information as the reference region information if the second data is reproduced; and
a fourth recording device for recording medium region information, each of the first data region information and the second data region information being to be reflected in the medium region information,
the first data region information is a region code for restricting a reproducible area of the first data,
the second data region is a region of code for restricting a reproducible area of the second data, and
the first data or the second data to be reproduced is reproducible if the first data region information or the second data region information set as the reference region information matches equipment region information being assigned to the information reproducing apparatus.

10. A non-transitory and computer-readable recording medium recording thereon a computer program for recording-control to control a computer provided in an information recording apparatus comprising: a first recording device for recording first data to which first data region information is assigned; a second recording device for recording second data to which second data region information which is different from the first data region information is assigned; a third recording device for recording control data including setting command data, the setting command data setting the first data region information as reference region information, which is referred to by an information reproducing apparatus, if the first data is reproduced and setting the second data region information as the reference region information if the second data is reproduced; and a region recording area in which medium region information is recorded, each of the first data region information and the second data region information being to be reflected in the medium region information, the first data region information is a region code for restricting a reproducible area of the first data, the second data region is a region of code for restricting a reproducible area of the second data, and the first data or the second data to be reproduced is reproducible if the first data region information or the second data region information set as the reference region information matches equipment region information being assigned to the information reproducing apparatus, said computer program making the computer function as at least one portion of said first recording device, said second recording device, said third recording device and said fourth recording device.

* * * * *